July 24, 1934.   L. F. DOUGLASS   1,967,468
APPARATUS FOR PRODUCING PANORAMIC PHOTOGRAPHIC PICTURES OR THE LIKE
Filed Dec. 28, 1932
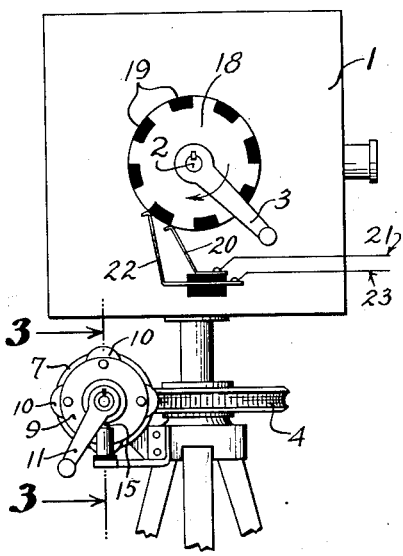
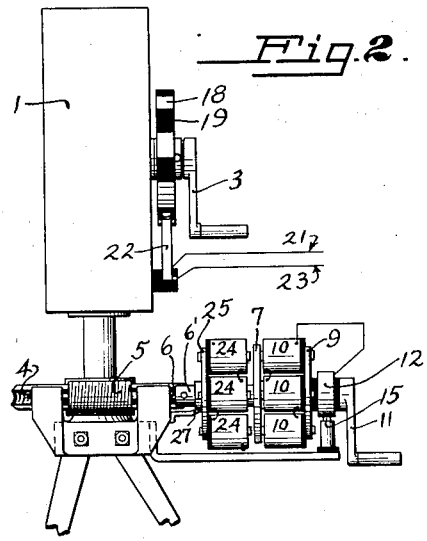
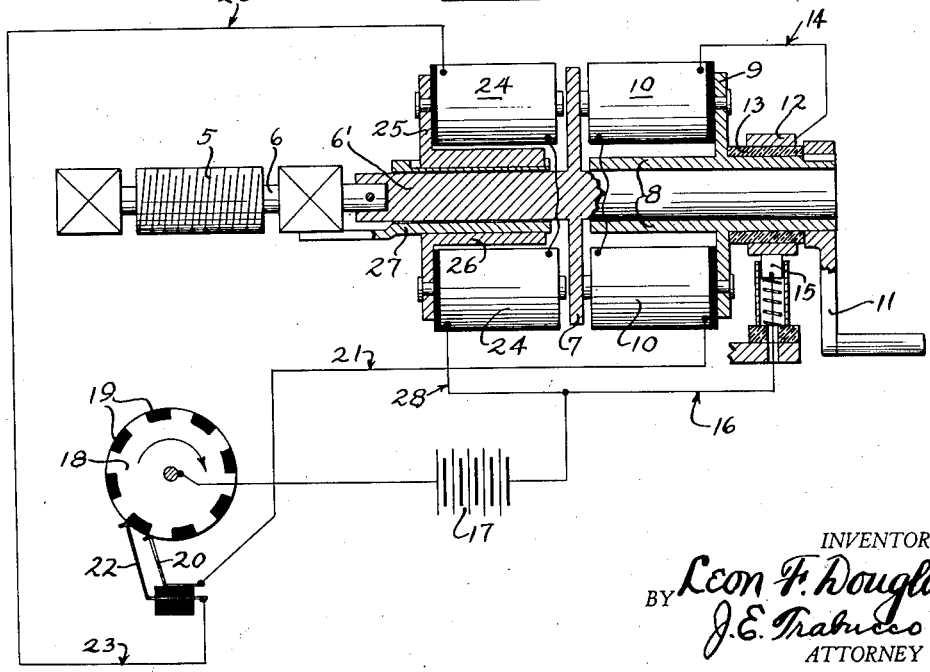
INVENTOR,
BY Leon F. Douglass
J. E. Trabucco
ATTORNEY Patented July 24, 1934

UNITED STATES PATENT OFFICE 1,967,468

APPARATUS FOR PRODUCING PANORAMIC PHOTOGRAPHIC PICTURES OR THE LIKE

Leon F. Douglass, Menlo Park, Calif.

Application December 28, 1932, Serial No. 649,125

5 Claims. (Cl. 88—16)

This invention relates to an improved apparatus for producing panoramic or similar photographic pictures.

In taking panoramic or other similar pictures with the photographic apparatus now commonly used, the motion picture camera is revolved about a pivot while successive exposures are being made. During the time the pivotal movement of the camera is taking place the camera shutter is opened and closed in the usual manner to produce successive exposures of the cinematographic film. The pivotal movement of the camera is ordinarily continuous and uninterrupted during the time the panoramic picture is being made. No provision is now made for stopping the pivotal movement of the camera during the short interval when the shutter is open and the exposure is being made. As a result of the camera's movement during the exposure of the film, a somewhat blurred and undesirable effect is produced.

In order to overcome this undesirable effect, I have provided apparatus for use with motion picture cameras which successively stops the pivotal movement of the camera each time an exposure is being made. With my improved apparatus the camera is normally at a standstill during the time each successive exposure is being made, thereby enabling the production of photographic images which are free from the usual blurred effects ordinarily accompanying the taking of panoramic pictures.

My invention therefore contemplates the provision of an improved apparatus for taking panoramic and other similar pictures in which the images are clear, distinct and free from blurred effects.

In the accompanying drawing:

Fig. 1 is a side elevation of the photographic apparatus embodying the preferred form of my invention;

Fig. 2 is a rear elevation of the apparatus; and

Fig. 3 is a vertical sectional view taken on the line 3—3 of Fig. 1, showing the wiring diagram.

Referring to the drawing the numeral 1 designates a motion picture camera of the ordinary kind embodying the usual photographic film advancing means and also the usual film exposing means. The film advancing mechanism as well as the film exposing means are operated in the usual manner by a shaft 2 having a hand crank 3 at its outwardly disposed end. The shutter of the film exposing means is ordinarily closed during the time the film advancing mechanism is being operated, and the film advancing means is normally stationary when the film is being exposed.

The camera is ordinarily mounted on a tripod or other suitable supporting means, and a rotatable gear 4 operatively connected to the camera serves to pivotally turn the camera when panoramic pictures are to be taken. The peripheral teeth of the gear 4 are in mesh with the teeth of a worm gear 5, the said worm gear being formed integrally with a shaft 6 which is preferably provided with an extension 6' flexibly attached thereto. The extension 6' of the shaft is provided with an outwardly disposed flange 7. Slidably mounted on the extension 6' is a cylindrical sleeve 8 having a flanged supporting member 9 thereon to which are secured a plurality of electro-magnets 10. The cylindrical sleeve is provided with a handle 11 which is employed to rotate the cylindrical sleeve 8 and the electro-magnets 10. When the electro-magnets become energized, they are forcibly pulled toward the flange 7, the ends of the said magnets thereupon firmly contacting with the said flange to form a positively acting clutch. During the time the current of electricity is energizing the electro-magnets, and while they are in firm engagement with the flange 7, the handle 11 may be manipulated to cause the rotation of the camera through the gears 5 and 4. Upon the current being discontinued to the magnets, they no longer firmly engage with the flange 7, thus permitting the sleeve 8, magnets 10 and handle 11 to be capable of independent rotation without affecting the movement of the camera. It is to be noted that the camera may be rotated by manipulating the handle 11 only when the electrical current is being supplied to the electromagnets 10.

In order to cause the flow of electrical energy to the electro-magnets during the time the photographic film in the camera is being advanced, I have positioned a metal ring 12 around the sleeve 8 and have insulated it from the said sleeve by a ring 13 made from suitable insulating material. The ring 12 is loosely mounted so the electrical wire 14 connecting the electro-magnets 10 and the said ring are not tangled or broken when the handle 11 is turned. The electro-magnets are preferably connected together in series, and a spring pressed brush 15 connected by an electrical conductor 16 to a battery 17 serves to carry electrical energy to the said magnets.

Secured to and rotatable with the shaft 2 of the camera, is a metal wheel 18 having a number of spaced insulating members 19 inserted at its periphery. Positioned in contact with the periphery of the wheel 18 is a metal brush 20 connected by a wire 21 or other suitable means to the electro-magnets 10. Thus when the brush 20 is in engagement with the metal periphery of the wheel 18, the circuit to the electro-magnets is closed, thereby permitting the flow of electrical energy to cause their energization and their immediate movement toward the flange 7 of the shaft's extension 6'. The clutch is thereby in positive engagement, and the camera may be pivotally turned by manipulating the handle 11. In order to immediately stop the rotary motion of the camera when the brush 20 no longer contacts with the metal periphery of the wheel 18, I have provided a brush 22 which is so positioned with reference to the brush 20 that it contacts with one of the insulating segments 19 at the same time the brush 20 contacts with the metal part of the wheel's periphery, or vice versa. The brush 22 is connected by a wire 23 or other suitable means to a plurality of electro-magnets 24, the said magnets being connected in series to one another. The magnets 24 are secured to the flange 25 of a splined sleeve 26, the said sleeve being slidably mounted upon a stationary tubular member 27, which by reason of a slot therein permits the sleeve and magnets to move back and forth without rotation with the shaft's extension 6' upon which the tubular member 27 is loosely but non-rotatably mounted. The electro-magnets 24 are connected by a wire 28 to the battery 17. Thus when the brush 22 is in contact with the metal periphery of the wheel 18 (at which time the circuit to the electro-magnets 10 is broken) the circuit to the electro-magnets 24 is closed. The consequent energizing of the electro-magnets 24 causes them to be drawn into engagement with the flange 7 of the shaft's extension 6'. Upon the magnets 24 positively engaging with the flange 7, the shaft 6 and the gears 4 and 5 are immediately stopped, thereby causing the camera's rotary motion to become suddenly and positively arrested.

The wheel 18 may be easily adjusted upon the shaft 2 for timing purposes, thus permitting adjustments so the circuit to the magnets 10 are closed at the identical time the shutter of the film exposing mechanism is closed. The two brushes 20 and 22 being normally positioned in fixed relation to one another, permit the opening of the circuit to one set of magnets while the circuit to the other set is closed. It is of course understood that the length of each of the metal portions of the wheel's periphery is such that the circuit to the electro-magnets 10 is closed for the length of time the shutter of the film exposing mechanism is closed.

It is obvious that my invention contemplates the use of other than electrical means for preventing the rotation of the camera during the exposure of the film, so for this reason it is to be understood that the drawing is illustrative of but one embodiment of my invention and that the appended claims are to determine the limits my invention may assume, rather than the disclosure herein made. Many of the motion picture cameras now in use have provision made therein for vertical pivotal movement. It is of course obvious that my invention is adapted for use with cameras which are tiltable or rotatable in any direction.

Having described my invention what I claim is:
1. In apparatus for the purpose described, a camera, film exposing means, means for pivotally moving the camera, and brake means synchronized with the film exposing means for stopping the pivotal movement of the camera during the operation of the film exposing means, the said brake means including one or more non-rotatable electro-magnets connected in an electrical circuit and movably mounted to engage with the means for pivotally moving the camera, and means for closing the circuit to the magnets when the film exposing means is operating.

2. In apparatus for the purpose described, a camera having film exposing means therein, camera rotating means having a flanged operating shaft associated therewith, one or more non-rotatable electro-magnets slidably mounted on the shaft, the said magnets being connected in an electrical circuit and adapted to engage with the flange on the shaft when the circuit is closed, and means synchronized with the film exposing means for closing the circuit during the operation of the said exposing means, whereby the magnets may be energized and moved into engagement with the flange to stop the rotary movement of the camera during the said operation of the film exposing means.

3. In apparatus for the purpose described, a camera having the usual film exposing mechanism, camera rotating means including a series of gears and an operating shaft therefor, the said shaft having a rigid flange thereon, one or more non-rotatable magnets movably positioned adjacent the flange, the said magnets being connected in an electrical circuit and adapted to engage with the flange when the circuit is closed, whereby the rotation of the shaft may be postively arrested, and means synchronized with the film exposing mechanism for closing the circuit during the operation of the said film exposing mechanism.

4. In apparatus for the purpose described, a camera having film exposing and film advancing mechanism therein, camera rotating means, an operating shaft for said rotating means, the said operating shaft having a flanged member rigidly secured thereto, a rotatable sleeve loosely mounted on the shaft at one side of the flanged member, an operating handle secured to the sleeve, one or more electro-magnets rigidly secured to the sleeve, the said electro-magnets being connected in an electrical circuit and adapted to move into firm engagement with the flanged member when the circuit is closed, whereby the camera rotating means may be operated, means synchronized with the film advancing mechanism for closing the circuit to the electro-magnets when the said film advancing mechanism is operating, and brake means for intermittently arresting the rotary movement of the camera, the said brake means including one or more non-rotatable electro-magnets mounted adjacent the flanged member and connected in an electrical circuit, the said magnets being adapted to firmly engage with the flanged member and arrest the rotary movement thereof when the circuit thereto is closed, and means synchronized with the film exposing means for closing the circuit to the last named magnets during the time the said film exposing means is operating.

5. In apparatus for the purpose described, a camera having film exposing mechanism therein, camera rotating means, including an operating shaft, one or more non-rotatable magnets connected in an electrical circuit and movably mounted adjacent the shaft, the said magnets when energized being adapted to move into firm engagement with a metal member rigidly secured to and carried by the shaft, whereby the rotary movement of the shaft may be arrested when the circuit is closed and the magnets are energized, and means synchronized with the film exposing mechanism for closing the circuit to the magnets during the operation of said exposing mechanism.

LEON F. DOUGLASS.